March 8, 1938.  O. WITTEL  2,110,477

LENS MOUNT CONSTRUCTION

Filed Feb. 4, 1936

Otto Wittel,
INVENTOR:

BY Newton M. Perrins
George A. Gillette, Jr.
ATTORNEYS.

Patented Mar. 8, 1938

2,110,477

UNITED STATES PATENT OFFICE 2,110,477

LENS MOUNT CONSTRUCTION

Otto Wittel, Rochester, N. Y., assignor, by mesne assignments, to Eastman Kodak Company, Jersey City, N. J., a corporation of New Jersey Application February 4, 1936, Serial No. 62,310

13 Claims. (Cl. 88—57)

The present invention relates to a lens mount construction and, more particularly, to a lens mount such that the objective may be readily detached and then replaced without disturbing the accurate location of the objective with respect to the support.

In view of great progress in the field of optics, many types of lenses of various focal lengths are now available. The best photographic results are obtained only with a lens selected according to the type of work to be done and, therefore, it is highly desirable to provide photographic apparatus with lens mount constructions such that the objectives may be readily interchanged without introducing any possible errors caused by inaccurate location of the objective lens mount upon the apparatus.

The primary object of the present invention is the provision of a lens mount construction which permits convenient and rapid mounting of the objective in accurate location and which also permits rapid removal of the objective.

Another object of the invention is the provision of a lens mount which merely requires insertion of the objective lens mount into a mounting socket and then a slight turn of the objective lens mount to fasten it accurately and securely within said socket.

Other objects of the invention will be suggested to those skilled in the art by the description which follows.

Reference is hereby made to the accompanying drawing wherein similar reference characters designate similar elements and wherein.

Figure 1:
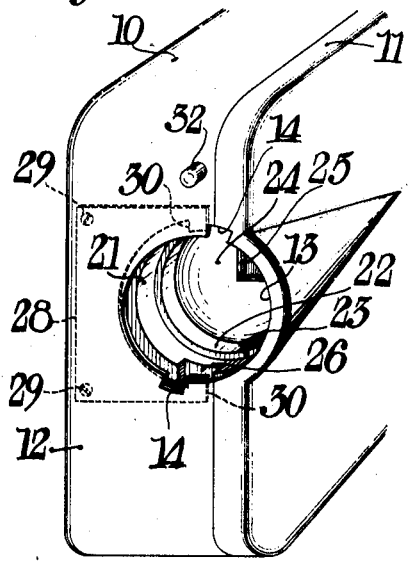
Figure 1 is a fragmentary perspective of a camera illustrating the socket within which the objective lens mount is to be mounted.

Although the lens mount construction of the invention is to be described with respect to a photographic camera, it is understood that the invention is also applicable to other types of apparatus which require accurate location of the objectives and rapid interchange of objectives.

The camera casing 10 has a cover 11 for enclosing the same. The front wall 12 is provided with an opening 13. A pair of notches 14 are provided in the periphery of opening 13 and are diametrically opposite each other.

Figure 3:
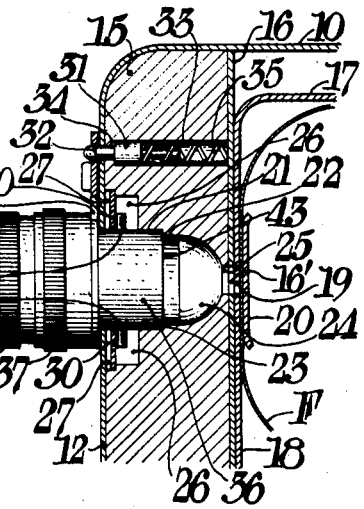
Figure 3 is a fragmentary cross-section through the center of the lens mount socket of Figure 1.

A supporting block 15, see Figure 3, is mounted within camera casing 10 adjacent the front wall 12 thereof. A plate 16 is fastened to the rear surface of supporting block 15 and provides a film locating surface. The film may be supplied to the camera within a magazine casing 17 including a front lateral wall 18, which is provided with an exposure aperture 19. The film F may be held against wall 18 by a presser pad 20 of any suitable design and resiliently maintained against the film F in any conventional manner. It will also be obvious to those skilled in the art that plate 16 with its opening 16' may constitute the front portion of a film gate for direct contact with the film F.

The supporting block 15 is provided with a cylindrical bore 21, which is adapted to receive a portion of the objective lens mount. A shoulder 22 is formed in supporting block 15 at the inner end of cylindrical bore 21 and has a face 23 which is accurately located with respect to the film locating surface of plate 16 on supporting block 15. Said supporting block 15 is also provided with a cavity 24 extending from shoulder 22 to an exposure opening 25 at the rear of supporting block 15.

The supporting block 15 is also provided with a pair of recesses 26 which adjoin the cylindrical bore 21, which are located near the outer end of said bore 21, and which are diametrically opposite each other. A depression 27 is formed in the front of supporting block 15 and forms with the front wall 12 of camera casing 10 a chamber within which a resilient means may be positioned.

A resilient means is located at the front of supporting block 15 and may comprise a spring member 28 which is fastened by a pair of screws 29 within the depression 27 of supporting block 15 and which has a pair of tongues 30 partially overhanging the front of each recess 26.

A locating means is also provided in said supporting block 15. Such locating means may comprise a bolt 31 having a restricted portion 32 which is slidable within a hole 33 having a restricted portion 34 and provided within supporting block 15. A coil spring 35 is placed within hole 33 and bears at one end against plate 16 and at the other end against bolt 31 to press the restricted portion 32 of said bolt 31 outwardly through the front wall 12 of camera casing 10.

Figure 2:
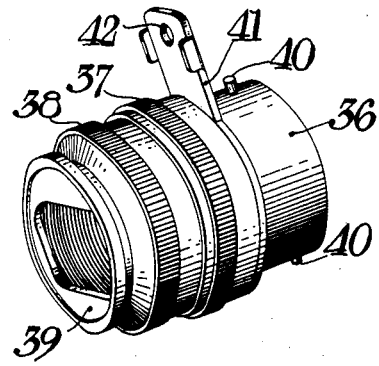
Figure 2 is a perspective view of an objective lens mount adapted for insertion into and attachment to the socket of the invention.

The optical objective for insertion in the lens mount socket just described may for the most part be of conventional design and may have any desired optical characteristics. A suitable objective lens mount is illustrated in Fig. 2 and includes a cylindrical section 36, a diaphragm adjusting ring 37, a focusing ring 38, and a front mask 39. The only special equipment necessary to adapt this objective lens mount for insertion into the lens mount socket of the invention is a plurality of projections or studs, such as pins 40, which may be diametrically opposite each other and a latch plate 41 which is provided with a hole 42. Said latch plate 41 is preferably fastened to the objective lens mount immediately behind the diaphragm adjusting ring 37 and is preferably rigid with respect to cylindrical section 36. It is also necessary that the bearing surface 43 at the rear of cylindrical section 36 be in a definite axial relation to the focal plane of the objective to insure that said focal plane will coincide with the plane of the film F after the objective lens mount is securely located in the lens mount socket.

The operation of the lens mount according to the invention will now be explained. The objective lens mount is first moved axially toward the supporting block 15 with the cylindrical section 36 entering the cylindrical bore 21 and with pins 40 passing through notches 14 in the front wall 12 of the casing 10, over the edges of spring member 28 and into the recesses 26 within said supporting block 15. The bearing surface 43 on the inner end of cylindrical section 36 will abut against the face 23 of shoulder 22 and, since said surface 43 and face 23 are very accurately located, the objective lens mount will also be accurately located. In this position of the objective lens mount the latch plate 41 will extend to one side of the end 32 of bolt 31. Now, by merely moving latch plate 41 in a counter clockwise direction, the entire objective lens mount is rotated to bring pins 40 into engagement with the tongues 30 of spring member 28 and to bring hole 42 opposite portion 32 of bolt 31. The tongues 30 will press upon the pins 40 and resiliently maintain bearing surface 43 of the objective lens mount snugly against the face 23 of shoulder 22, while portion 32 of bolt 31 will enter the hole 32 of latch plate 41 and maintain the objective lens mount in a definite angular position.

The lens mount construction of the invention may be still further simplified by elimination of the latch plate 41 and bolt 31. The pressure of tongues 30 upon the rounded surfaces of pins 40 will provide a camming action which tends to prevent accidental rotation and unfastening of the objective lens mount, and which presses the pins 40 against the side walls of recesses 26. The angular location of the objective lens mount is then determined by said side walls of recesses 26.

Figure 4:
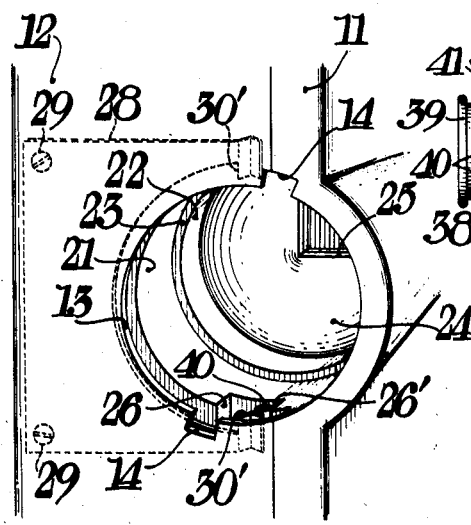
Figure 4 is a fragmentary perspective of an objective socket with a modified form of tongue on the spring member.

The pin engaging surfaces of the tongues on spring member 28 may be formed to increase the aforesaid camming action. For instance, the tongues 30', see Figure 4, may have a V-shaped cross-section so that the inclined surfaces of said tongues 30' are first repelled by the pins 40 upon initial rotation of the objective lens mount within the lens mount socket. Additional rotation of the objective lens mount moves the pins 40 past the summits of tongues 30' which then press upon said pins 40 both to hold the bearing surface 43 of the objective lens mount against the accurate face 23 of shoulder 22 for accurate axial location of the objective lens mount and to hold the pins 40 against the side walls 26' of recesses 26 for accurate angular location of the objective lens mount.

As a result, the objective lens mount may be accurately located within the lens mount socket of the invention merely by inserting cylindrical section 36 and pins 40 respectively into bore 21 and recesses 26 and then turning the objective lens mount. The tongues 30 and 30' hold the objective lens mount in accurate axial position with surface 43 against face 23 while the latching means may supplement tongues 30 for accurate angular location and secure fastening of the objective lens mount, but the tongues may be deformed as are tongues 30' to replace said latching means and to provide the fastening and angular locating influences as well as the axial locating devices.

Many variations of the invention will be apparent to those skilled in the art and the present disclosure is to be construed in an illustrative sense while the invention is limited only by the scope of the appended claims.

Having now particularly described my invention, what I desire to secure by Letters Patent of the United States and what I claim is:

1. In a photographic apparatus having a film plane, the combination with an objective lens mount having a cylindrical section, including a bearing surface in definite axial relation to the focal plane of the objective, and including at least one projection extending radially of said cylindrical section, of a supporting block on said apparatus and provided with a bore adapted to receive the cylindrical section of said objective lens mount, and having a shoulder which has a face in definite axial relation to said film plane and a resilient means adjacent said bore and adapted upon rotation of said objective lens mount directly to engage said projection resiliently to maintain the bearing surface of said objective lens mount against the face on the shoulder of said supporting block.

2. In a photographic apparatus having a film plane, the combination with an objective lens mount having a cylindrical section, including a bearing surface in definite axial relation to the focal plane of the objective, and including a plurality of projections extending radially of said cylindrical section, of a supporting block on said apparatus and provided with a bore adapted to receive the cylindrical section of said objective lens mount, and having an internal shoulder which has a face in definite axial relation to said film plane, and a plurality of resilient members arranged adjacent said bore and each adapted, upon relative rotation between said objective lens mount and said supporting block, directly to engage the respective projections and resiliently to maintain the bearing surface of said objective lens mount against the face on the internal shoulder of said supporting block.

3. In a photographic apparatus having a film plane, the combination with an objective lens mount having a cylindrical section, including a bearing surface in definite axial relation to the focal plane of the objective, and including a stud, of a supporting block on said apparatus provided with a bore adapted to receive the cylindrical section of said objective lens mount, and having at one end of said bore a shoulder which has a face in definite axial relation to said film plane, and a resilient means at the other end of said bore for engaging said stud resiliently to maintain the bearing surface of said objective lens mount against the face on the shoulder of said supporting block.

4. In a photographic apparatus having a film plane, the combination with an objective lens mount having a cylindrical section, including a bearing surface in definite axial relation to the focal plane of the objective, and including at least one projection extending radially of said cylindrical section, of a supporting block on said apparatus and provided with a bore adapted to receive the cylindrical section of said objective lens mount, and having a shoulder which has a face in definite axial relation to said film plane, a resilient means adjacent said bore for directly engaging each projection resiliently to maintain the bearing surface of said objective lens mount against the face on the shoulder of said supporting block, and an engaging means on said supporting block, operative only when said objective lens mount is in a definite angular position to maintain the same in that position.

5. In a photographic apparatus having a film plane, the combination with an objective lens mount having a cylindrical section, including a bearing surface in definite axial relation to the focal plane of the objective, and including a stud, of a supporting block on said apparatus provided with a bore adapted to receive the cylindrical section of said objective lens mount, and having at one end of said bore a shoulder which has a face in definite axial relation to said film plane, a resilient means at the other end of said bore for engaging said stud resiliently to maintain the bearing surface of said objective lens mount against the face on the shoulder of said supporting block, and engaging means on said supporting block for engaging and maintaining said objective lens mount in a definite angular position.

6. In a photographic apparatus having a film plane, the combination with an objective lens mount having a cylindrical section, including a bearing surface in definite axial relation to the focal plane of the objective, and including a stud, of a supporting block on said apparatus provided with a bore adapted to receive the cylindrical section of said objective lens mount, having at one end of said bore a shoulder which has a face in definite axial relation to said film plane, and provided adjacent the other end of said bore with a recess adapted to receive the stud of said objective, and a resilient means at said other end of said bore, having a tongue for overhanging said recess and adapted upon relative movement between said objective lens mount and resilient means to engage said stud and resiliently to maintain the bearing surface of said objective lens mount against the face on the shoulder of said supporting block.

7. In a photographic apparatus having a film plane, the combination with an objective lens mount having a cylindrical section, including a bearing surface in definite axial relation to the focal plane of the objective, and including a stud, of a supporting block on said apparatus provided with a bore adapted to receive the cylindrical section of said objective lens mount, having at one end of said bore a shoulder which has a face in definite axial relation to said film plane, and provided adjacent the other end of said bore with a recess adapted to receive the stud of said objective lens mount, and a spring member at said other end of said bore, having a tongue for overhanging said recess and adapted, upon relative rotation of said objective lens mount, to engage said stud and resiliently to maintain the bearing surface of said objective lens mount against the face on the shoulder of said supporting block and to maintain said stud against one side of said recess which side of the recess also limits the relative rotation of said objective lens mount with respect to said spring member.

8. In a photographic apparatus having a film plane, the combination with an objective lens mount having a cylindrical section which has a bearing surface in definite axial relation to the focal plane of the objective, and including a stud and a locating plate, of a supporting block on said apparatus provided with a bore adapted to receive the cylindrical section of said objective lens mount, and having at one end of said bore a shoulder which has a face in definite axial relation to said film plane, a resilient means at the other end of said bore and having a tongue adapted upon relative rotation of said objective lens mount to engage said stud resiliently to maintain the bearing surface of said objective lens mount against the face on the shoulder of said supporting block, and a spring pressed member on said supporting block for engaging said locating plate of the objective lens mount and positioned to engage said locating plate only when said objective lens mount is in a definite angular position.

9. In a photographic apparatus having a film plane, the combination with an objective lens mount having a cylindrical section which has a bearing surface in definite axial relation to the focal plane of the objective, and including a stud and a locating plate which is provided with a hole, of a supporting block on said apparatus provided with a bore adapted to receive the cylindrical section of said objective lens mount, and having at one end of said bore a shoulder which has a face in definite axial relation to said film plane, a resilient means at the other end of said bore and having a tongue adapted upon relative rotation of said objective lens mount to engage said stud resiliently to maintain the bearing surface of said objective lens mount against the face on the shoulder of said supporting block, and a spring pressed bolt in said supporting block for engaging the hole in said locating plate on the objective lens mount and positioned to engage said hole only when said objective lens mount is in a definite angular position.

10. In a photographic apparatus having a film plane, the combination with an objective lens mount having a cylindrical section, including a bearing surface at one end of said cylindrical section, and including a plurality of studs on said cylindrical section, of a supporting block on said apparatus provided with a cylindrical bore adapted to receive the cylindrical section of said objective lens mount, having a shoulder at the inner end of said bore with a face in definite axial relation to said film plane, and provided with a plurality of recesses adjacent the outer end of said bore and adapted to receive said stud of the objective lens mount, and a spring member having a plurality of tongues located and arranged so that relative rotation of said objective lens mount brings said studs into engagement with said tongues which press the bearing surface of said objective lens mount against the face on the shoulder of said supporting block.

11. In a photographic apparatus, the combination with an objective lens mount having a cylindrical section, including a bearing surface at one end of said cylindrical section, and including a stud on said cylindrical section, of a supporting block on said apparatus having a rear surface adapted to locate a film strip, provided with a cylindrical bore adapted to receive the cylindrical section of said objective lens mount, and having at the inner end of said bore a face in fixed spaced relation to the film locating surface of said supporting block, and a resilient means including a tongue for engaging the stud on said objective lens mount and pressing the bearing surface of said objective lens mount against said face of the supporting block to locate the objective lens mount in an accurate axial position with respect to the film locating surface of said supporting block.

12. In a photographic apparatus, the combination with an objective lens mount having a cylindrical section, including a bearing surface at one end of said cylindrical section, and including a stud on said cylindrical section, of a supporting block on said apparatus having a rear surface adapted to locate a film strip, provided with a cylindrical bore adapted to receive the cylindrical section of said objective lens mount, provided with a recess adapted to receive the stud on said objective, and having at the inner end of said bore a shoulder with a face in predetermined fixed relation to the film locating surface of said supporting block, and a resilient means having a tongue overhanging a portion of said recess and adapted upon rotation of said objective lens mount and of said stud within the recess to engage said stud and press the bearing surface of said objective lens mount against the face of the shoulder in said supporting block.

13. In a photographic apparatus having a film plane, the combination with an objective lens mount having a cylindrical section, including a bearing surface in definite axial relation to the focal plane of the objective, and including a pin, of a supporting block on said apparatus provided with a bore adapted to receive the cylindrical section of said objective lens mount, having at one end of said bore a shoulder which has a face in definite axial relation to said film plane, and provided adjacent the other end of said bore with a recess having a side wall and adapted to receive the pin of said objective lens mount, and a resilient means having a tongue with an objective pin engaging surface which is adapted to press against said pin resiliently to maintain the bearing surface of said objective lens mount against the face on the shoulder of said supporting block and the pin on said objective lens mount against the side wall of said recess.

OTTO WITTEL.